United States Patent [19]

Moreau et al.

[11] Patent Number: 5,717,330
[45] Date of Patent: Feb. 10, 1998

[54] MAGNETOSTRICTIVE LINEAR DISPLACEMENT TRANSDUCER UTILIZING AXIAL STRAIN PULSES

[76] Inventors: Terence J. Moreau, 1105 - 2222 Bellevue Avenue, West Vancouver, British Columbia, Canada, V7V 1C7; Andrew Warren McFadyen, 4440 Coldfall Road, Richmond, British Columbia, Canada, V7C 1P8

[21] Appl. No.: 612,329

[22] Filed: Mar. 7, 1996

[51] Int. Cl.⁶ .................................................. G01B 7/14
[52] U.S. Cl. .................................................. 324/207.13
[58] Field of Search ........................ 324/207.12, 207.13, 324/200, 207.24; 73/597, 779, 632

[56] References Cited

U.S. PATENT DOCUMENTS

| | | | |
|---|---|---|---|
| 3,898,555 | 8/1975 | Tellerman | 324/34 D |
| 3,961,243 | 6/1976 | Schulz | 324/34 D |
| 4,071,818 | 1/1978 | Krisst | 324/207.13 |
| 4,654,590 | 3/1987 | Kitaura et al. | 324/208 |
| 4,667,158 | 5/1987 | Redlich | 324/207 |
| 4,678,993 | 7/1987 | Vinnemann et al. | 324/208 |
| 4,726,226 | 2/1988 | Tellerman | 73/292 |
| 4,734,870 | 3/1988 | Snyder et al. | 364/556 |
| 4,774,465 | 9/1988 | Nilius | 324/208 |
| 4,893,077 | 1/1990 | Auchterlonie | 324/208 |
| 4,939,457 | 7/1990 | Tellerman | 324/207.13 |
| 4,950,988 | 8/1990 | Garshelis | 324/207.24 |
| 4,958,332 | 9/1990 | Tellerman | 367/140 |
| 4,975,643 | 12/1990 | Buchwald | 324/207.12 |
| 5,050,430 | 9/1991 | Begin et al. | 73/292 |
| 5,198,761 | 3/1993 | Hashimoto et al. | 324/207.12 |
| 5,334,933 | 8/1994 | Tellerman | 324/207.13 |
| 5,351,004 | 9/1994 | Daniels et al. | 324/207.13 |
| 5,381,091 | 1/1995 | Kobayashi et al. | 324/207.17 |
| 5,406,200 | 4/1995 | Begin et al. | 324/207.12 |
| 5,412,316 | 5/1995 | Dumais et al. | 324/207.13 |

Primary Examiner—Sandra L. O'Shea
Assistant Examiner—Roger C. Phillips
Attorney, Agent, or Firm—Norman M. Cameron

[57] ABSTRACT

A magnetostrictive linear displacement transducer includes an elongated member of a material with a large magnetostriction coefficient. There is a coil and a pulse driver for magnetizing the member to cause a detectable magnetostrictive effect for short discrete periods of time. A magnet is movable along the path adjacent the member and is capable of magnetizing a localized portion of the member adjacent the magnet efficiently to cause an alteration in the magnetostrictive effect in the localized portion in concert with the pulse driver and the coil. There is a piezoelectric device at one end for detecting axial strain pulses propagated along the member caused by the magnetostrictive effect. There is a comparator for measuring time lags between initiation of each separate discrete period of time and detection of a corresponding strain pulses by the piezoelectric device and thereby a position of the magnet along the path.

18 Claims, 9 Drawing Sheets

MAGNETOSTRICTIVE LINEAR DISPLACEMENT TRANSDUCER UTILIZING AXIAL STRAIN PULSES

BACKGROUND OF THE INVENTION

This invention relates to devices for measuring linear displacement of an object, such as a piston in a hydraulic cylinder, and, in particular, to such devices using a magnetostrictive effect.

It is desirable or imperative in some instances to know the position of one component which moves relative to another. Examples of such applications include position indicators for industrial, mobile, construction and agricultural equipment, off-road vehicles and marine steering systems used on boats equipped with autopilots. What needs to be ascertained in some instances is the position of a piston within a hydraulic cylinder. Such devices are also useful for other applications including motion control devices for processes and robotics, closed-loop and fuzzy logic control systems, servo valves and fluid level sensing in tanks.

There are two general classes of such position sensors, namely contact and non-contact sensors. Contact sensors include potentiometers, rheostats, and resistive film sensors. Non-contact sensors include proximity sensors, optical encoders, hall effect sensors, radar and microwave devices, acoustic devices, linear displacement transducers, and linear variable differential transformers. However, prior art devices are not ideal for all purposes. For example, in the case of non-contact sensors, prior art devices are often too inaccurate, complicated, expensive or bulky for many applications. In addition they may be too fragile for some applications such as use in mobile equipment. They may also be affected by the earth's magnetic field or extraneous sources of magnetism and therefore would not provide the required degree of accuracy for applications such as position sensing on mobile equipment.

A magnetostrictive effect has been utilized previously for linear displacement transducers. Examples are found in U.S. Pat. No. 3,898,555 to Tellerman and U.S. Pat. No. 5,017,867 to Dumais et al. A torsional motion sensor is used to detect torsional motion within the magnetostrictive wave guide tube induced by passage of an electrical pulse down a wire which interacts with a magnetic field of an adjacent magnet. The position of the magnet along the tube can thereby be determined.

U.S. Pat. No. 5,198,761 to Hashimoto et al. discloses a stroke detector including a driving coil wound around a member with a large magnetostriction coefficient. A pulse input current to the coil causes magnetostriction phenomena on the magnetostriction line generating an ultrasonic wave. A detecting coil wound on the member induces a detection signal generated by reverse magnetostriction when the ultrasonic wave passes by the position of the magnet on the magnetostriction member.

The prior art magnetostrictive transducers sold under the trademark TEMPOSONICS are adapted to fit within the piston rod of an hydraulic or pneumatic cylinder. This means that a piston rod has to be bored out at considerable cost in order to insert the probe. It employs a relatively delicate tubular wave guide. There is considerable dead space at both ends of the probe which limits the measurable stroke of the piston. The device typically measures the position of four magnets which are oriented with their poles being spaced-apart radially with respect to the center line of the tube. A current is pulsed down the tube, or a wire within the tube, which puts the tube into magnetostriction during the pulse. A twisting strain is produced at the position of the magnet which is sensed by a torsional strain sensor at one end of the tube. The connection of the torsional sensor to the wave guide tube tends to be fragile. Also the location of the connection is vital to transducer accuracy.

However some such magnetostrictive transducers are not well adapted for applications where power consumption is critical or where they must fit into space constrained locations. In addition, they may be too expensive, by virtue, for example, of their sensitive torsional measuring means, mounting and dampening requirements and driver and detection circuitry requirements, to be practical for some applications and may be prone to inaccuracies or damage caused by shock and vibration in applications such as mobile equipment.

Accordingly it is an object of the invention to provide an improved magnetostrictive linear displacement transducer which is well adapted for use in relatively unfavourable environments such as mobile equipment.

It is also an object of the invention to provide an improved magnetostrictive linear displacement transducer with minimal dead zones which can fit into tight locations, for example in conjunction with hydraulic cylinders where the space availability may be limited very closely to the length and diameter of the cylinder.

It is a further object of the invention to provide an improved magnetostrictive linear displacement transducer which is economical to produce, highly accurate and durable and reliable in operation especially for such applications as industrial mobile equipment.

It is still a further object of the invention to provide an improved magnetostrictive linear displacement transducer which has reduced power consumption compared to the prior art.

It is a still further object of the invention to provide an improved magnetostrictive linear displacement transducer which can be retro fitted in place of prior art devices but which also permits a broader range of mounting configurations such as on the exterior of pneumatic or hydraulic cylinders.

SUMMARY OF THE INVENTION

In accordance with these objects, there is provided a magnetostrictive linear displacement transducer including an elongated member of a material with a large magnetostrictive coefficient. There is an excitation coil about the member. There is means for generating electrical signals connected to the coil to produce axial magnetic fields along the member. There is a magnet adjacent the member. There is means for detecting axial strain pulses propagated along the member and caused by the magnetostrictive effect. There is also means for determining time delays between the signals and the axial strain pulses propagated along the member as induced by the signals and thereby a position of the magnet along the member.

The magnet may be oriented so its poles are spaced-apart in a direction parallel to the elongated member.

Orienting the magnet parallel to the elongated member produces a stronger magnetic field, and hence permits a larger magnetic gap between the magnet and the sensor, than in devices where the poles are oriented radially with respect to the member. Accordingly the device can be mounted outside a cylinder instead of inside as in some prior art devices.

The means for detecting may include a piezoelectric detector connected to one end of the member.

The means for generating may include a pulse generator. The means for determining may include a time delay comparator electrically connected to the pulse generator and to the piezoelectric detector.

There may be a part of the member folded back in a hook-like manner at an end thereof opposite the piezoelectric detector.

The invention offers significant advantages over the prior art. The device can fit into tight locations where physical length is equal to or close to the length of the elongated member. Devices according to the invention are much more producible and simpler than prior art devices requiring a torsional strain sensor delicately connected to a wave guide tube as part of the transducer. They can be smaller in diameter and length to fit into smaller locations. They have inherently better resistance to vibration than some prior art devices.

DESCRIPTION OF THE PREFERRED EMBODIMENTS

Figure 1:
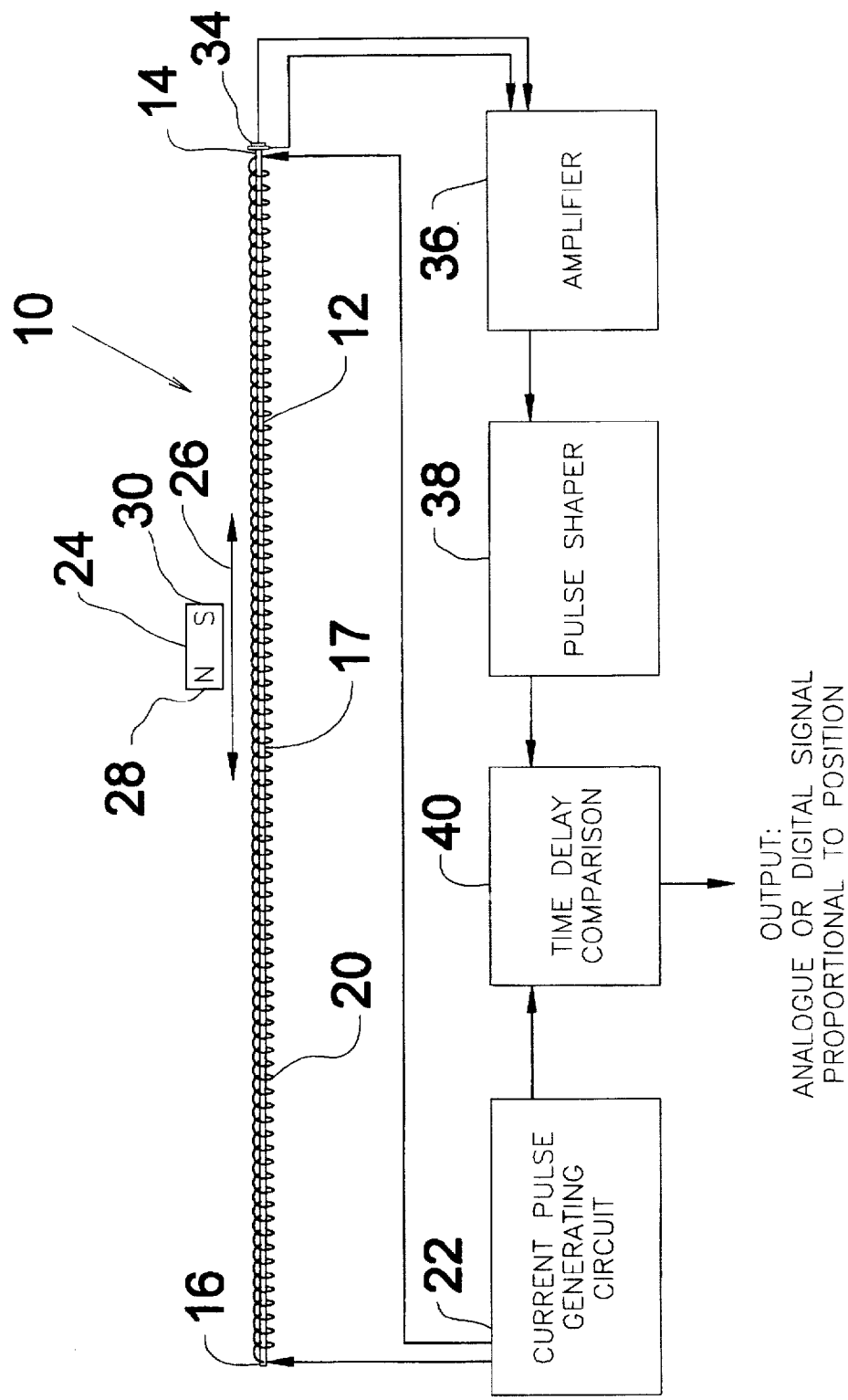
FIG. 1 is a diagrammatic view of a magnetostrictive linear displacement transducer according to a first embodiment of the invention.

Referring to FIG. 1, there is a magnetostrictive linear displacement transducer 10 which can be used for a number of different applications such as sensing the position of a piston within a hydraulic cylinder. There is an elongated member 12 which in this example is a wire of a material having a high magnetostriction coefficient. The range from +20×10⁻⁶ Δl/l to +30×10⁻⁶ Δl/l is preferred. The material used in this example is NIRON 52 available from Carpenter Technology Corporation. The wire utilized has a diameter of 0.025". Other materials and other types of elongated members could be substituted. However, the material should have a high magnetostriction coefficient and a high stiffness. Iron/cobalt, metglass and ferrites are also suitable. A tubular member could also be substituted. The member 12 has a first end 14, a second end 16 and a straight portion 17 between the ends. Alternatively the member could be curved or flexible.

An excitation coil 20 of an electrically conductive material is wound about the member 12 along the straight portion between ends 14 and 16. Alternatively one or more coils could be positioned adjacent the member and along the member. They could be wound about an inert casing about the elongated member. The coil is of copper foil, ⅟₁₆" wide and 0.002" thick in this particular example, but other conductive materials, such as wire or film could be substituted. The width of the foil strip, or the gage of the wire, can be selected, along with the turns per inch of the coil, to adjust the inductance of the coil. Through this means a wide variety of operative D.C. voltages and transducer lengths can be accommodated. In this example the winding is such as to use a standard +5 v DC and this minimizes circuit costs. The coil is connected to a current pulse generating circuit 22 which, together with the coil, provides first means for magnetizing the member 12 for short, discrete periods of time corresponding to pulses generated by circuit 22. Typical pulse durations are 3 to 15 µs long and the pulses are repeated at a frequency of one pulse per millisecond. This is suitable for a magnet 24, described below, which is ⅛" to ¼" wide.

Magnet 24 adjacent the member 12 is movable along a path represented by arrows 26 adjacent the member and extending between ends 14 and 16 of the member. Alternatively the magnet could be stationary and the transducer could move. The magnet in this example is oriented so that north pole 28 and south pole 30 are aligned parallel to the member 12 and to oppose the field produced by the excitation coil. The magnet could also be oriented 90° from the position shown as well. This may give a higher precision result, due to a more narrowly defined saturation zone, but gives a reduced magnetic gap capability.

The magnet 24 may comprise, for example, the piston of a hydraulic cylinder or may be mounted on such a piston. The elongated member 12 and the coil would be typically mounted coaxially with the piston rod or on the exterior of the cylinder which would have a wall of a non-ferromagnetic material. The transducer 10 would be used in such an application to ascertain the position of the piston within the cylinder. Details of such a combination are included below.

Figure 7:
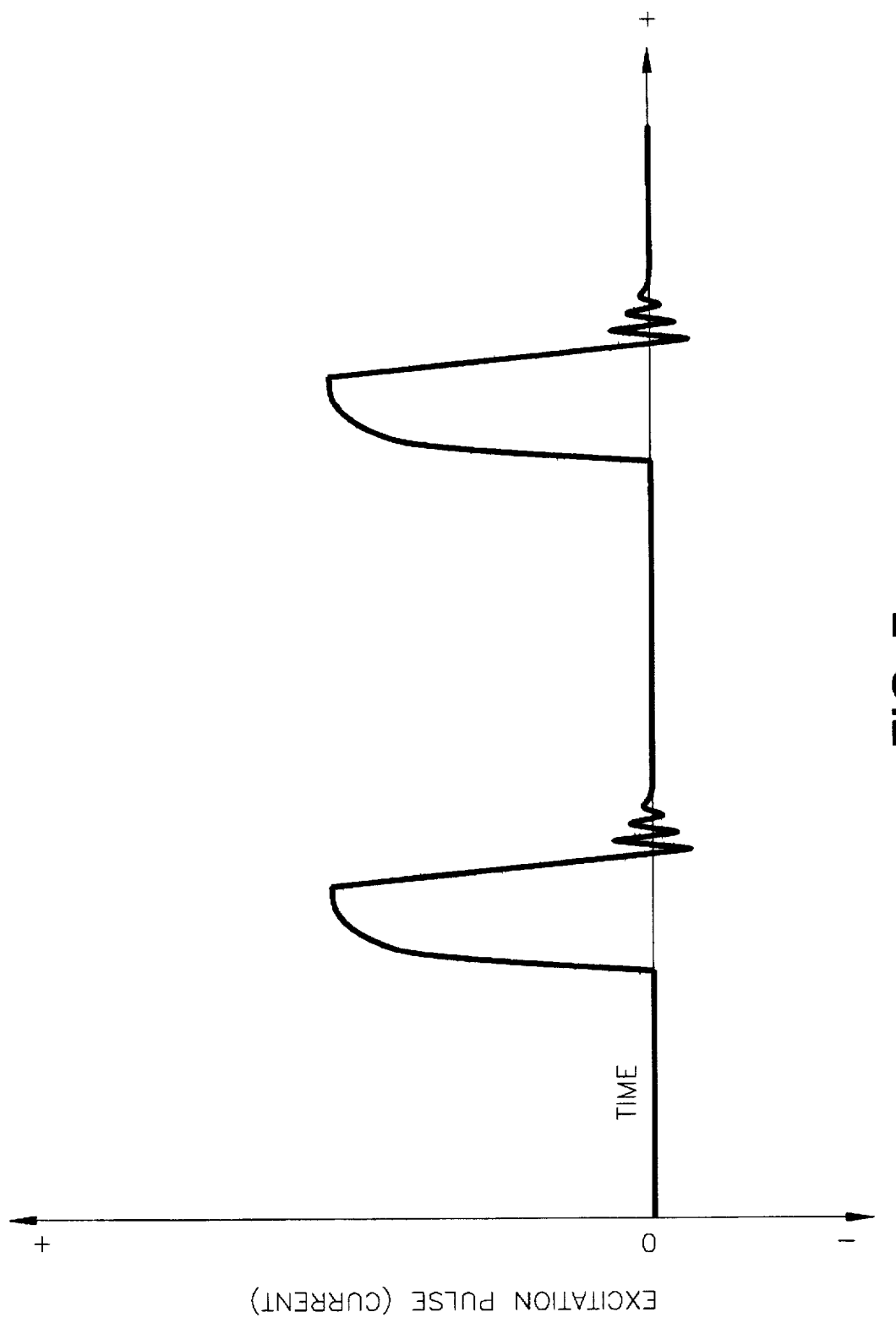
FIG. 7 is a graph showing a typical current pulse for the transducers of FIGS. 1–6.

The pulse generating circuit 22 in this example provides pulses of D.C. current 10 microseconds long and spaced-apart by 1 millisecond intervals. The pulses, shown in FIG. 7, have a rise time of 3–5 microseconds in this example. The peak current in this example is approximately 5 amps at 5 volts D.C. power input.

Figure 10:
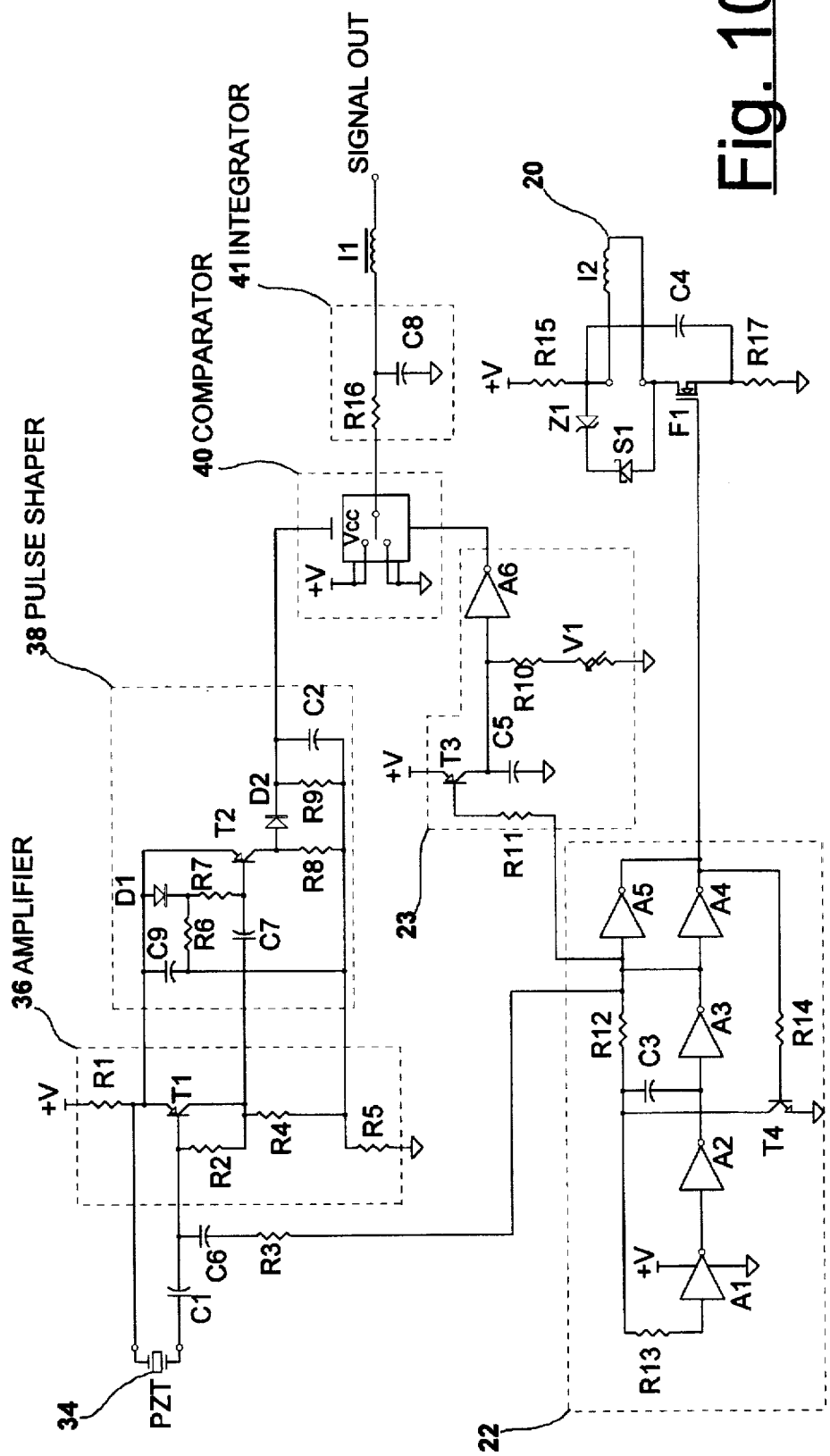
FIG. 10 is a schematic diagram of the electronic components of the embodiment of FIG. 1.

Details of circuit 22 are shown in FIG. 10. It includes five amplifiers A1–A5, three resistors R12–R14, a comparator C3 and a transistor T4.

FET F1 acts as a driver to excite coil 20 in association resistors R15 and R16, capacitor C4, Zener diode Z1 and Schottky diode S1.

Trim center 23 acts as a retriggerable monostable as described below. It includes transistor T3, comparator C5, resistors K10 and R11, amplifier A6 and potentiometer V1.

Other types of pulse drivers or means could be utilized in other examples of the invention to provide relatively short, but discrete pulses of current through the coil. Alternatively other means could be used for magnetizing the member 12 for such short discrete periods of time. The effect of the pulse generating circuit and coil is to produce axial magnetic fields in the member 12. As used herein the term "axial" refers to directions along the longitudinal direction of the member 12. The axial magnetic field produces a uniform field along the member and hence uniform magnetostriction. Also the axial magnetostrictive pulse results in less end bounce and distortion and is easier to dampen compared to torsional pulses. In this example the magnetic fields are sufficient to produce a magnetostrictive effect along the portion of the member co-extensive with the coil. The field produced is counter to the field of magnet 24 in this embodiment.

Figure 9:
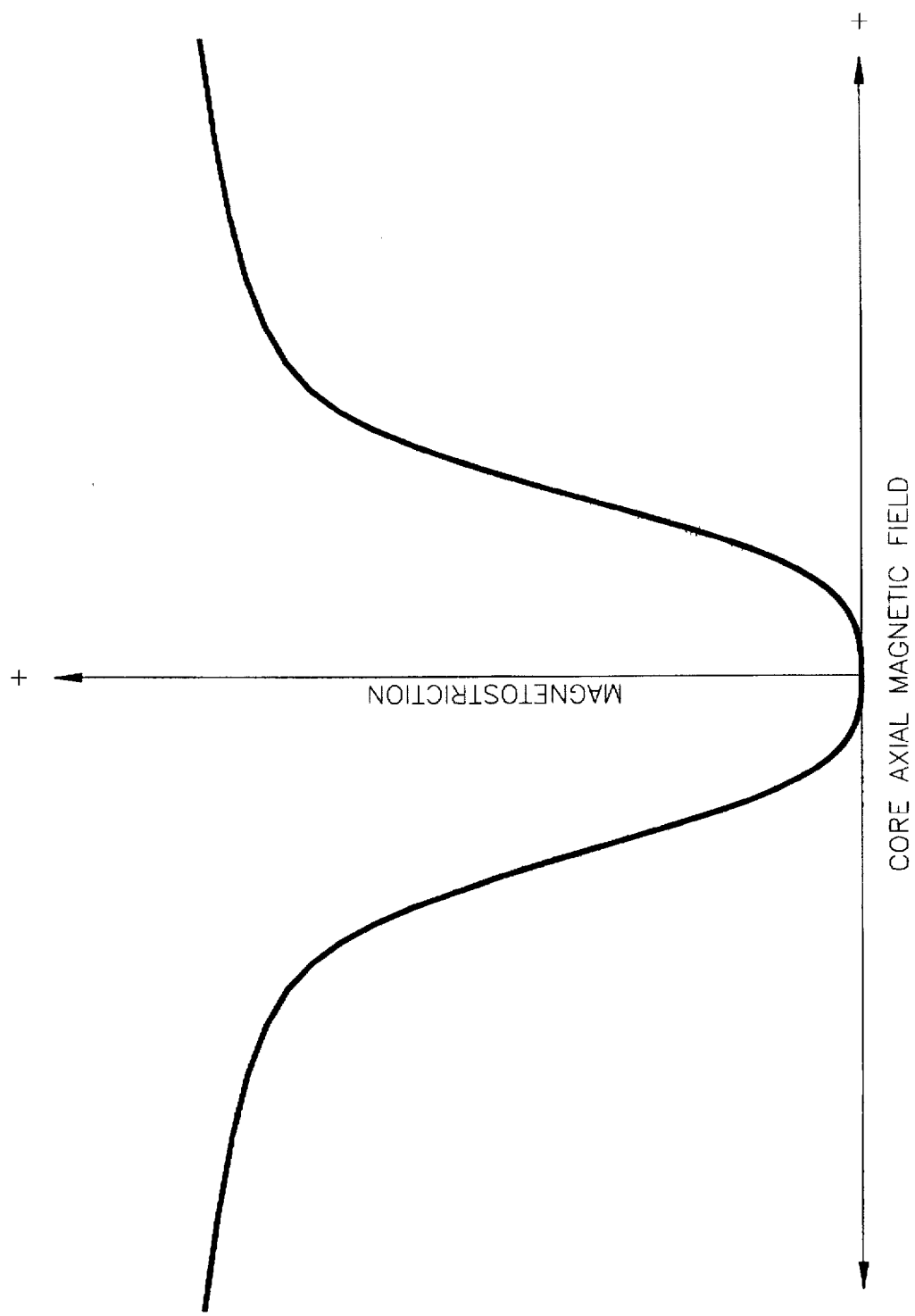
FIG. 9 is a graph showing the magnetostriction level of the magnetostrictive member of FIGS. 1–6 plotted against the core axial magnetic field.

The magnet is movable along path 26. When the coil is de-energized only a localized portion of member 12 adjacent the magnet exhibits magnetostriction. In this example this portion is in magnetostriction saturation. When the coil is energized, the rest of the member apart from this localized portion exhibits magnetostriction, to a saturation level in this example. However the magnetic field created by the magnet counters the magnetic field created by the pulse acting on the coil in the localized region. In this embodiment this means that this region is taken out of the saturation caused by the magnet. This sudden change in the magnetostriction in the localized portion causes a strain pulse to propagate axially along the member from a point adjacent to the magnet in the form of sound waves, ultra sonic waves in this example. FIG. 9 shows the level of magnetostriction in member 12 plotted against the axial magnetic field of member 12 (the core).

There is also means for measuring time lags between initiation of each of the separate discrete periods of time when the pulse circuit provides pulses of current to the coil and detection of corresponding sound waves formed in the member 12 by the magnetostrictive effect adjacent the magnet as each pulse is provided by circuit 22. Each pulse of current for all practical purposes instantaneously magnetizes the entire member. Peak magnetization occurs at the peak of each pulse shown in FIG. 7 The effect is repeated as each pulse is conducted from the pulse generating circuit to the coil. The rapidly changing magnetization creates magnetostrictive strain pulses in this example, in the member 12 which start close to the position of the magnet and are propagated along the member towards both ends at about 15,000 ft./sec. In this example a piezoelectric element 34 is connected directly to end 14 of the member 12. It takes a finite time for ultrasonic waves to move along the member 12 from the position of magnet 24 to the piezoelectric element 34 at end 14. This time delay is indicative of the position of the magnet 24 along path 26 and along member 12. It may be appreciated that the time delay is greater when the magnet is near end 16 and smaller as the magnet approaches the piezoelectric element 34 at end 14.

Figure 8:
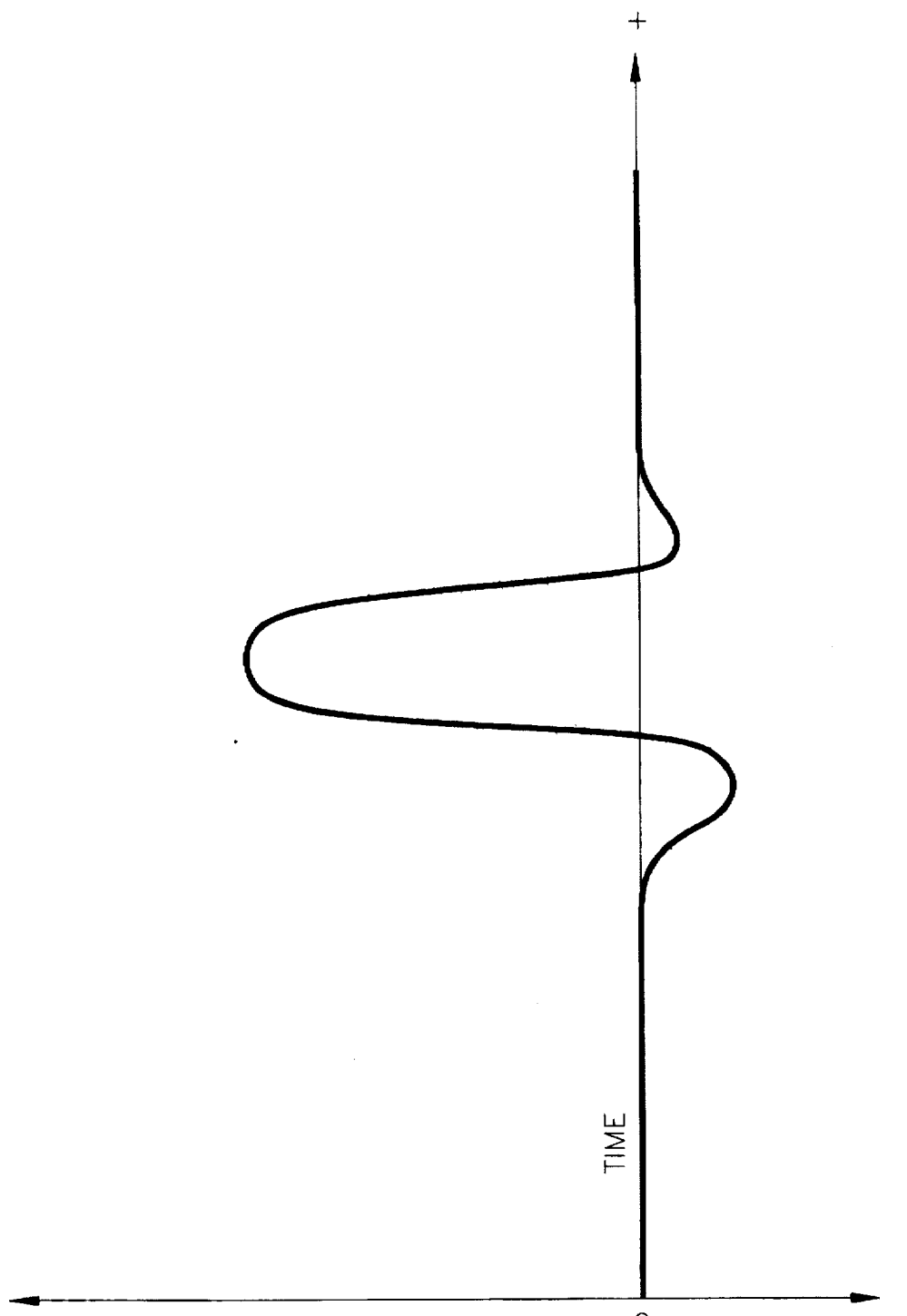
FIG. 8 is a graph showing the output signal delivered to the amplifier of FIG. 1 or FIG. 4.

The piezoelectric element 34 produces electrical pulses at the same frequency as the pulses of circuit 22, but with the time delay caused by the propagation of ultrasonic waves from the position on the member 12 adjacent magnet 24 to end 14 thereof. The piezoelectric element in this example is approximately 0.1" square although other configurations such as circular elements could be substituted. FIG. 8 shows the pulses produced by element 34.

The piezoelectric element is connected to a high gain, narrow band amplifier 36 which is tuned to the frequency of the pulses described above. As seen in FIG. 10 the amplifier is connected to a pulse shaper 38 which serves to sharpen the pulses originating with the piezoelectric element. As seen in FIG. 10 there are two transistors T1 and T2, nine resistors R1-R9, two caparators C1 and C2 and two diodes D1 and D2 in the amplifier/pulse shaper portion of the circuit.

Time delay monostable circuit 23 is connected to the current pulse generator 22 as seen in FIG. 10. The time delay monostable circuit is set to define the end point of the waveguide (member 12). The current pulse triggers the monostable circuit and defines a start point. Between the start and end points an electronic time window is defined. This corresponds to the monostable output and to the maximum length of travel of the magnet along the member 12.

Comparator 40 produces a signal proportional to the time delay between initiation of the pulse from circuit 22 to receipt of the signal from pulse shaper 38. An integrator 41 ramps first in one direction from the start of the time window until the digitizer output indicates that the ultrasonic pulse has been detected. The integrator ramps in the opposite direction until the end of the time window. The cycle is then repeated.

Figure 2:
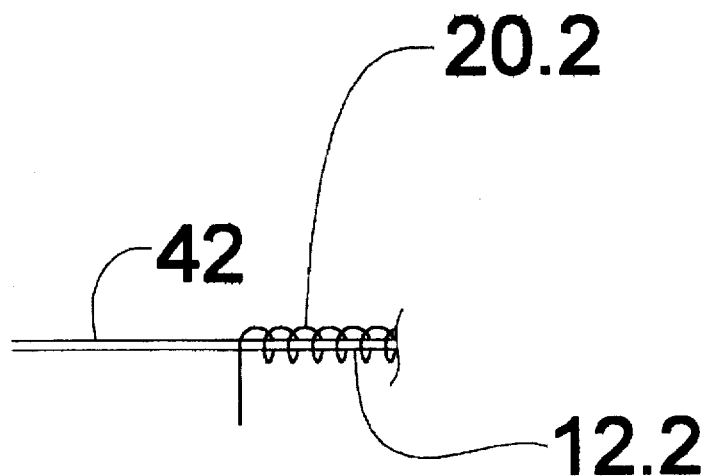
FIG. 2 is a fragmentary view of one end of a transducer according to a second embodiment of the invention.
Figure 3:
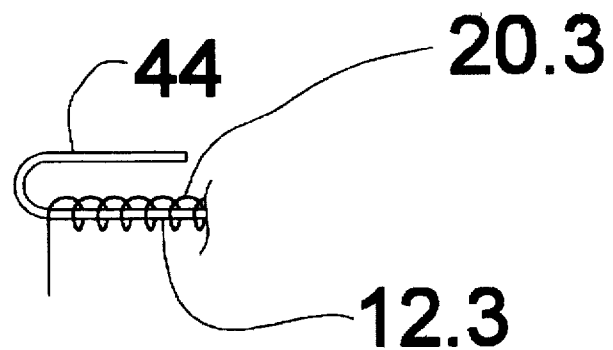
FIG. 3 is a fragmentary view of one end of a transducer according to a third embodiment of the invention.

FIGS. 2 and 3 show alternative embodiments of the invention. Member 12.2 of FIG. 2 has an extension 42 beyond coil 20.2. In FIG. 3, member 12.3 has a folded-back or hook-like portion 44 extending beyond coil 20.3. The purpose of the extension and of the folded-back or hook-like portion of the members is to void interference and a null point near end 16 of the member 12 which would otherwise result from reflections of pulses off the end of the wire. This extension or hook-like portion does not serve as means for damping as in the prior art, but instead repositions the reflection/null point such that it does not influence the signal received by piezoelectric element 24. The member could have an extension 42 at one or both ends. Alternatively the end of the member could be crimped or cut at an oblique angle. As a further alternative software signal processing could be used to identify and remove the effects of end reflection.

Figure 4:
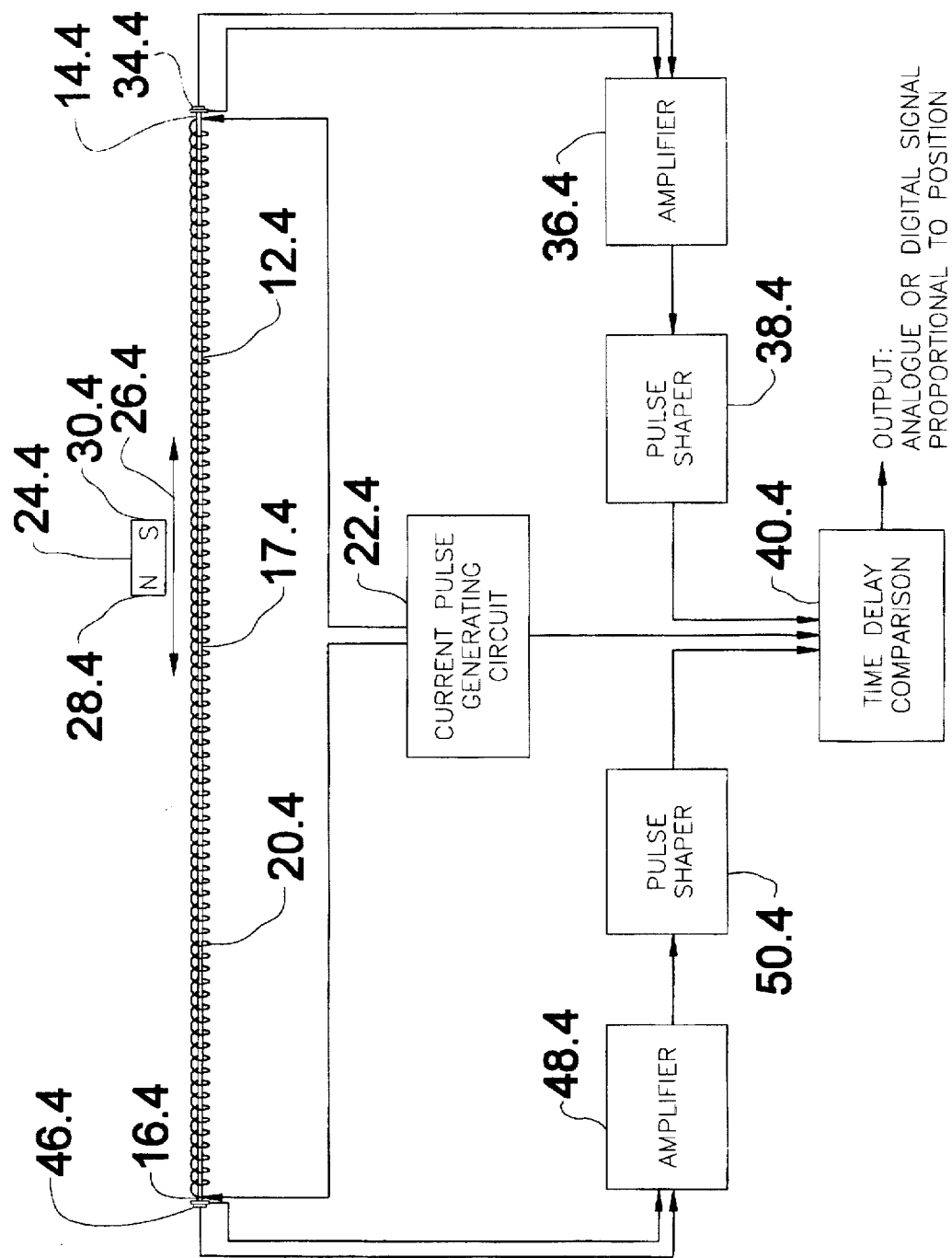
FIG. 4 is a view similar to FIG. 1 of a fourth embodiment of the invention.

An alternative embodiment is shown in FIG. 4 where like parts have like numbers as in FIG. 1 with the additional designation "0.4". In this embodiment there is an additional piezoelectric element 46.4 at the opposite end 16.4 of piezoelectric element 34.4. There is also a second amplifier 48.4 and a second pulse shaper 50.4. A more accurate calculation of the position of the magnet can be obtained with this embodiment because two separate time delays are measured from the pulses received by piezoelectric elements 34.4 and 46.4. The ratio of these two time delays indicates the position of the magnet along the member 12.4. Noise signals can be filtered out because the sum of the time delays for true signals must be constant for a transducer of a given length.

Figure 5:
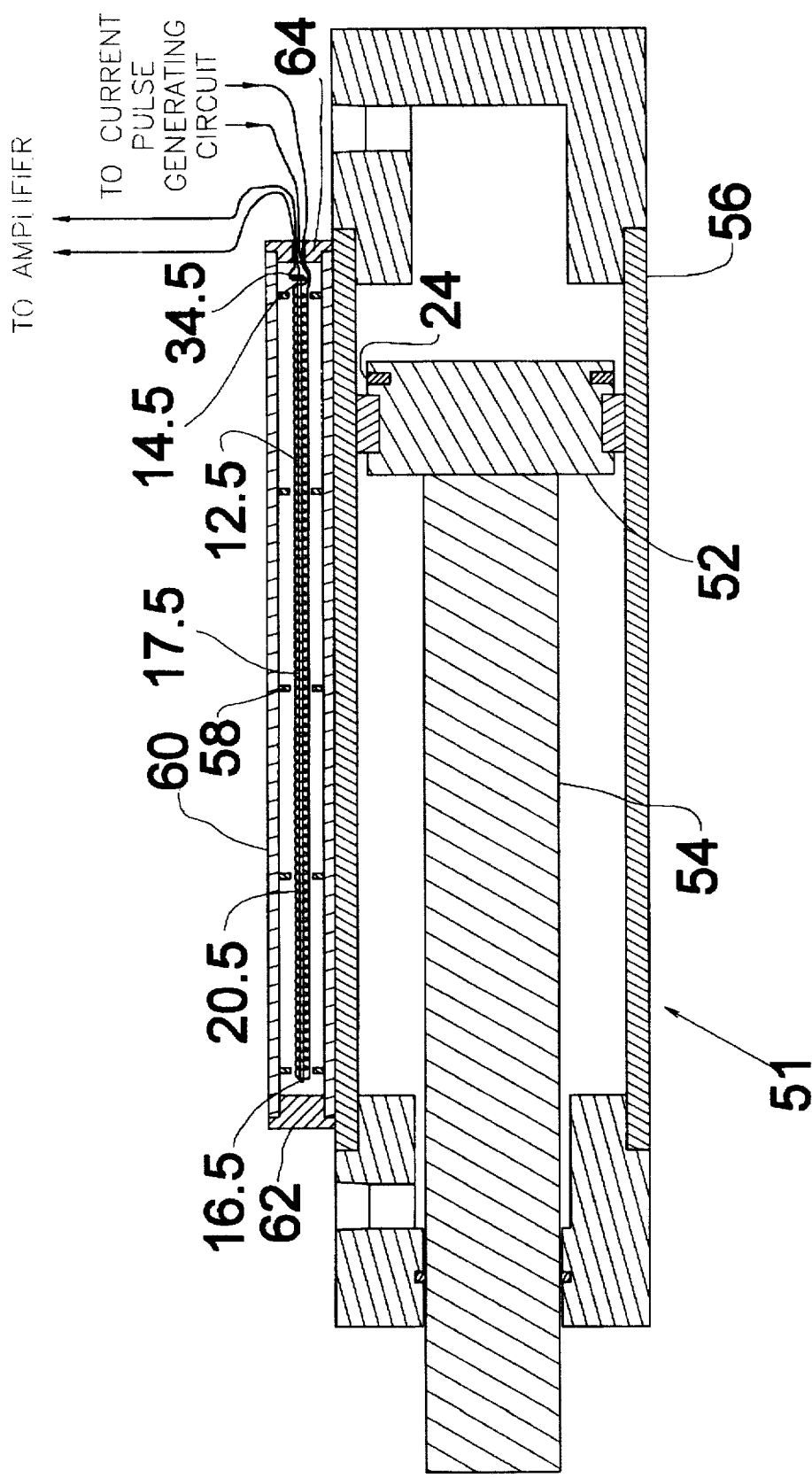
FIG. 5 is a longitudinal section of a fluid actuator with a magnetostrictive linear displacement transducer installed externally thereon.

FIG. 5 shows a typical installation of the transducer 10 of FIG. 1 on an hydraulic actuator 51 which includes a cylinder 56, a piston 52 and a piston rod 54 connected to the piston. The transducer 10 is mounted in an exterior tubular casing 60 connected to the outside of the cylinder such that the member 12 extends parallel to the piston rod. The member 12 is supported by a series of annular inserts 58 in the tube. The casing has plugs 62 and 64 at opposite ends thereof.

Figure 6:
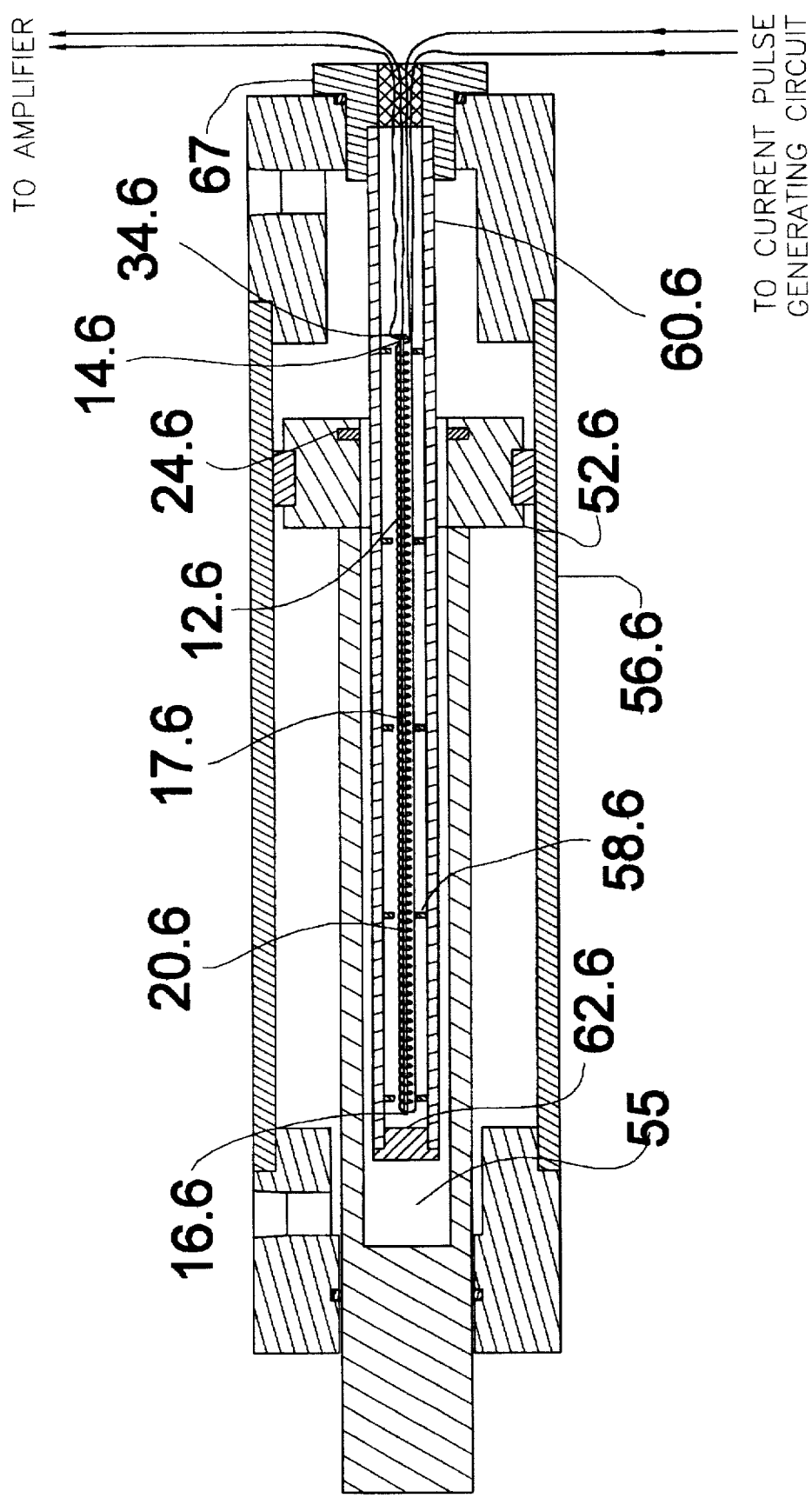
FIG. 6 is a view similar to FIG. 5 with the transducer installed internally along the piston rod thereof.

FIG. 6 shows an alternative installation of the transducer 10 which is more conventional from the point of view of the prior art. Here the components of the cylinder and mounting system equivalent to those in FIG. 5 are given the same numbers but with the additional designation "0.6". Here the transducer 10 is mounted coaxially with piston rod 54.6 within central bore 55 thereof. The casing 60.6 is fixedly connected to a plug 67 at the end of the cylinder.

It will be understood by someone skilled in the art that many of the details provided above are by way of example only and are not intended to limit the scope of the invention which is to be interpreted with reference to the following claims.

What is claimed is:

1. A magnetostrictive linear displacement transducer, comprising:

an elongated member of a material with a large magnetostriction coefficient, the member having a first end and a second end, the member having a folded-back portion adjacent the second end;

an excitation coil extending along the member;

means for generating electrical signals, said means being connected to the coil and producing axial magnetic fields along the member;

a magnet adjacent the member; and means for determining time delays between said signals and axial strain pulses travelling along the member caused by magnetostrictive changes in the member adjacent the magnet and accordingly the position of the magnet along the member, the means for determining including a piezoelectric device connected to the first end of the member.

2. A transducer as claimed in claim 1, wherein the means for generating signals and the coil produce an axial magnetic field with a strength sufficient to cause a magnetostrictive effect in the member and the magnet causes an alternation in the magnetostrictive effect in the member adjacent the magnet.

3. A transducer as claimed in claim 1, wherein the means for determining includes a time delay comparator.

4. A transducer as claimed in claim 3, further including an amplifier connected to the piezoelectric device.

5. A transducer as claimed in claim 4, further including a pulse shaper connected to the amplifier.

6. A transducer as claimed in claim 1, wherein the means for generating includes a current pulse generator.

7. A transducer as claimed in claim 6, wherein the current generator pulses in cycles of 10 microseconds on and 1 millisecond off.

8. A transducer as claimed in claim 1, wherein the elongated member is a wire.

9. A transducer as claimed in claim 8, wherein the wire has a diameter of 0.025".

10. An indicator as claimed in claim 1, wherein the elongated member has a magnetostrictive coefficient in a range between $+20 \times 10^{-6}$ $\Delta l/l$ to $+30 \times 10^{-6}$ $\Delta l/l$.

11. A transducer as claimed in claim 1, wherein the coil extends completely along the member from the first end to the second end apart from the folded-back portion.

12. A transducer as claimed in claim 1, wherein the magnet has north and south poles aligned parallel to the elongated member.

13. A magnetostrictive linear displacement transducer comprising:

an elongated member of a material with a large magnetostrictive coefficient;

first means for magnetizing the member with an axial magnetic field sufficient to put the member into magnetostrictive saturation for short discrete periods of time;

second means movable relatively along a path adjacent the member and capable of magnetizing a localized portion of the member adjacent the second means sufficiently to cause a magnetic field in the localized portion which counters the magnetic field caused by the first means and taking said localized portion out of magnetostrictive saturation during each discrete period of time;

third means for detecting axial strain pulses propagated along the member and caused by the taking out of the localized portion from magnetostrictive saturation; and fourth means for measuring time lags between initiation of each said separate discrete period of time and detection of a corresponding said strain pulse by the third means and thereby a position of the second means along the path.

14. An magnetostrictive linear displacement transducer, comprising:

a length of wire having a first end and a second end, the wire being of a stiff material with a high magnetostrictive coefficient;

a coil of an electrically conductive material wound about the wire from the first end to the second end;

a first piezoelectric detector connected to the second end of the wire to detect axial strain pulses travelling along the wire;

a magnet movable relatively along a path parallel to the wire;

a current pulse generator connected to the coil; and a means connected to the pulse generator and the piezoelectric detector to ascertain time delays between current pulses generated by said pulse generator and strain pulses caused by a magnetostrictive effect adjacent the magnet and, accordingly, the position of the magnet along the wire.

15. A transducer as claimed in claim 14, wherein there is a second piezoelectric detector at the first end of the wire.

16. A transducer as claimed in claim 15, wherein the coil is formed by a metal foil strip wound about the wire.

17. A transducer as claimed in claim 16, wherein the means to ascertain time delays ascertains time delays from the magnet to both detectors.

18. A transducer as claimed in claim 17, wherein the means reduces errors by comparing a sum of the time delays to both detectors with a constant reference corresponding to a time delay from the first end to the second end of the wire.

* * * * *